United States Patent [19]

Sibley et al.

[11] Patent Number: 5,298,208
[45] Date of Patent: Mar. 29, 1994

[54] METHOD FOR MOLDING A PROTECTIVE HELMET

[75] Inventors: Kent V. Sibley, Keller, Tex.; Donald E. Ponzer, Imperial, Mo.

[73] Assignee: Athletic Helmet, Inc., Knoxville, Tenn.

[21] Appl. No.: 785,348

[22] Filed: Nov. 1, 1991

[51] Int. Cl.⁵ .............................................. B29C 67/22
[52] U.S. Cl. ..................... 264/51; 264/45.4; 264/318
[58] Field of Search ................ 264/45.4, 51, DIG. 10, 264/53, 318

[56] References Cited

U.S. PATENT DOCUMENTS

| | | | |
|---|---|---|---|
| D. 272,769 | 2/1984 | Sundahl et al. | D2/231 |
| D. 285,980 | 10/1986 | McNabb | D29/12 |
| D. 293,496 | 12/1987 | Gentes | D29/12 |
| D. 299,978 | 2/1989 | Chiarella | D29/12 |
| D. 303,851 | 10/1989 | Gentes | D29/12 |
| 2,908,943 | 10/1959 | Miller | 264/46.6 |
| 3,274,612 | 9/1966 | Merriam | 2/3 R |
| 3,783,450 | 1/1974 | O'Connor | 2/3 R |
| 3,873,997 | 4/1975 | Gooding | 2/3 R |
| 3,874,830 | 4/1975 | Carter et al. | 425/384 |
| 3,925,821 | 12/1975 | Lewicki | 2/3 R |
| 3,935,044 | 1/1976 | Daly | 264/45.4 |
| 4,095,931 | 6/1978 | Reitan | 425/549 |
| 4,115,874 | 9/1978 | Hasegawa | 2/425 |
| 4,141,085 | 2/1979 | Adams, Sr. | 2/410 |
| 4,278,628 | 7/1981 | Montgomery et al. | 264/45.5 |
| 4,434,514 | 3/1984 | Sundahl et al. | 2/425 |
| 4,443,891 | 4/1984 | Blomgren et al. | 2/414 |
| 4,653,123 | 3/1987 | Broersma | 2/425 |
| 4,766,614 | 8/1988 | Cantwell et al. | 2/414 |
| 4,818,451 | 4/1989 | Arai et al. | 264/40.3 |
| 4,901,373 | 2/1990 | Broersma | 2/421 |
| 4,903,348 | 2/1990 | Broersma | 2/421 |
| 4,903,350 | 2/1990 | Gentes et al. | 2/421 |
| 4,915,609 | 4/1990 | Hahn et al. | 425/384 |

FOREIGN PATENT DOCUMENTS

8204838 9/1983 France .

*Primary Examiner*—Allan R. Kuhns
*Attorney, Agent, or Firm*—Willian Brinks Hofer Gilson & Lione

[57] ABSTRACT

A protective helmet and method and apparatus for making same. The helmet is made of an expanded, resilient polymer and configured with an undercut portion and with holes for ventilation and/or the mounting of a helmet retention system. The holes are generally perpendicular to the surface of the helmet at the hole. The mold for making the helmet includes a core and a cavity. The cavity is configured with projections for molding holes in the back of the helmet and the core is configured with projections for molding holes in the front of the helmet. The space between the core and cavity when in an engaged position defines the shape of the helmet, including any desired undercut portions. The helmet is molded by injecting compressed, resilient polymeric beads into the mold, venting the mold while applying heat to expand the beads, permitting the mold to cool and retracting the cavity from the core along a line of retraction to release the part from the mold.

10 Claims, 4 Drawing Sheets

METHOD FOR MOLDING A PROTECTIVE HELMET

BACKGROUND OF THE INVENTION

This invention relates to an improved protective helmet and a method and apparatus for making such a helmet. More particularly, the present invention relates to a helmet, and method and apparatus for making the same, having an undercut portion and perpendicularly directed holes which may be formed with a molding process.

Although protective helmets have long been essential equipment in contact sports such as baseball and football, they are finding more favor in non-contact sports such as bicycling, skateboarding and skating. In many of these principally non-contact sports, a potential impact to the wearer of the helmet occurs when the wearer falls down, striking his head on the ground or other object. Thus, helmets used in such non-contact sports are ideally designed to protect as much of the wearer's head as is possible.

A popular design for such a helmet is a compound curved surface having a generally elliptical hemispherical shell shape. Because of manufacturing constraints discussed below, most such helmets do not exceed 180 degrees of curvature in any single direction.

Even though such hemispherically shaped helmets cover a major portion of the skull, in use they can lack effectiveness. A helmet having the general shape of a hemispherical shell, with only 180 degrees of curvature, will sit on the top of the wearer's head. A retention system, usually in the form of a chin strap, must be employed to keep the helmet attached to the head in the event of a fall. Without a retention system, the helmet is only held on the wearer's head by the force of gravity.

However, the motion of the wearer's body during a fall which results in any substantial impact to the head is typically quite turbulent. With any significant turbulence of the body, the retention system may be incapable of preventing the helmet from shifting either down over the forehead, thereby leaving the back of the head exposed, or shifting rearwardly, leaving the forehead exposed. In either situation, a portion of the head which would otherwise be covered by the helmet is left exposed.

Even with an adequate retention system, properly adjusted by the wearer of the helmet, a helmet whose compound curved surface does not extend beyond 180 degrees still leaves portions of the head exposed. These include the portion of the skull inferior to the occipital lobe, including particularly the mastoid bone —the area of the cranial cavity where a basil skull fracture is most likely to occur.

One way of providing for additional coverage by the helmet is to extend the curvature of the helmet beyond 180 degrees, providing the helmet with a "backdraft" or "undercut," and allowing the helmet to cover the area inferior to the occipital lobe. An additional advantage of such a design is that the helmet, rather than just sitting on the head, is secured to the head by the undercut. When a helmet with an undercut is employed with a retention system, shifting of the helmet as a result of agitation of the head during a fall is minimized.

Protective helmets for non-contact sports such as bicycling, skateboarding and skating are typically made of expanded, non-resilient polymers such as expanded polystyrene (EPS). EPS consists of plastic cells that have been bonded together in the shape of a helmet during the molding process. EPS is currently the material of choice for such helmets because it is lightweight and has excellent shock attenuating properties When subjected to an impact, the cells of an EPS helmet will "crush," or permanently deform, thereby protecting the wearer of the helmet by attenuating the energy of the impact. However, the inelasticity of EPS that allows for such good shock attenuation properties has some disadvantages.

For example, helmets made of EPS are rigid, inelastic, and have very little flexibility. Because EPS helmet liners are rigid and inflexible, they tend to break or crack on substantial impact. Therefore, helmets made of EPS are generally considered to be "singleimpact" helmets because they are no longer effective after a single substantial impact and must thereafter be replaced.

EPS helmets must typically be employed with a covering surrounding the EPS liner. In the event the EPS liner breaks into pieces upon impact, the cover preserves the integrity of the helmet. Coverings used on EPS helmets range from high-density plastic shell covers to fabric covers designed to merely hold the pieces together in the event of a fall. Regardless of the cover employed, utilizing a covering in connection with an EPS helmet adds cost and complexity to the manufacturing of the helmet.

Another significant disadvantage arising out of the inelasticity of EPS is that its use imposes limits on the shapes of helmets which can be molded. EPS helmets are generally made by a foam molding injection process. A typical mold for an EPS helmet liner has a core and a cavity. The space between the core and the cavity defines the shape of the helmet. The core is generally hemispherical in shape, and configured to roughly match the shape of the top of a human head. The cavity has generally the same shape as the core, but is slightly larger by a predetermined amount, thereby determining the wall thickness of the helmet.

When molding an EPS helmet, raw polystyrene beads containing a blowing agent are exposed to heat and pre-expanded to roughly the density desired in the helmet. The beads are then fed into the mold where they are further heated, causing additional expansion of the beads, forcing them to conform to the shape of the mold and causing the beads to bond to each other.

The mold is then allowed to cool, permitting the EPS to stabilize, at which time the core and the cavity are separated, usually by retracting the cavity from the core along a straight line of retraction, leaving the EPS helmet attached to the core. The helmet is then ejected from the core by a blast of air channeled into the core or with an ejector pin pushing the helmet off the core.

Care must be taken when ejecting the EPS helmet from the core to ensure that the helmet is not broken during the ejection process. To this end, the core of the mold is typically coated with a release agent, such as Teflon, to facilitate removal of the helmet.

Thus, the fragile nature of EPS helmets places certain limitations on the shapes of helmets which may be molded using EPS technology. For example, molding an EPS helmet with any significant undercut is impossible on a conventional mold. Because a helmet with an undercut has an inside curvature extending beyond 180 degrees, the helmet could not be removed from the core of the mold without breaking the helmet. In other words, an EPS helmet with an undercut would not have sufficient elasticity to permit the helmet to elastically deform a sufficient amount to be removed from the core of the mold.

Complex molds with collapsible cores have been utilized to manufacture EPS helmets with an undercut. Such molds are expensive and can be complicated to operate. Because steam is frequently utilized as a heat source in the molding process, such collapsible cores oxidize quickly and must be replaced with more frequency than non-collapsible molds.

Another attempt of the prior art to form an EPS helmet with an undercut is to mold the helmet in two sections and then attach the pieces. A significant disadvantage of this process is the additional cost of manufacture. Additionally, the impact-resistant properties of such a two-piece helmet are not as favorable as with a one-piece helmet.

The prior art has made attempts to design an EPS helmet providing similar protection to a helmet with an undercut. Such attempts have resulted in helmets having a generally hemispherical shell portion with a rear section extending downwardly in a straight line from the edge of the shell. Because such a design does not curve inwardly toward the head, the helmet is still susceptible to substantial movement during a fall.

An additional problem encountered in the manufacture of EPS helmets is configuring the helmet with holes in it to accommodate a helmet retention system or air vents. Virtually all sport helmets made today must be manufactured with a configuration of holes in them to accommodate both a helmet retention system and some form of an air ventilation system.

One method employed by the prior art for forming holes in an EPS helmet is to cut the holes in after the molding process with a hot knife or wire. The principal disadvantage to this procedure is that it can be extremely messy because melted EPS tends to accumulate on the knife and around the work station where the cutting is performed. Additionally, manually forming the holes in the helmet represents an additional step in the manufacturing process, resulting in increased manufacturing costs.

Attempts have been made to mold the holes in an EPS helmet at the same time the helmet is being molded. One method employed by the prior art is to configure the core and/or the cavity with projections to form the holes in the helmet as the part is molded. However, because of the extreme brittle nature of EPS, any projections extending into the part must necessarily be positioned along the line of retraction of the cavity. Otherwise the part cannot be removed from the mold without breaking. In a conventional molding process, this would result in the holes in the helmet being configured vertically.

Preferably, however, holes used for ventilation purposes are configured horizontally (as the helmet is worn) or are configured substantially perpendicular to a line tangent to the surface of the helmet at the hole. Because these positions are not along the line of retraction, they cannot be molded into an EPS helmet using a conventional molding process Perhaps a more significant disadvantage of molding vertically positioned holes into the helmet is that the amount of material taken from the helmet is greater than necessary. For example, when attempting to mold a hole in the front of the helmet with a mold projection which must extend vertically, a great deal of material must be displaced to form the hole. In some helmet designs, the additional material taken from the helmet would unacceptably weaken the helmet.

Another attempt made by the prior art to efficiently mold holes into EPS helmets is to employ a "sliding" core in which there are movable projections in the core which correspond in size to the holes to be formed in the helmet. When molding the helmet, the projections are inserted into the void between the core and the cavity before the polystyrene beads are introduced into the mold. After the part cools, the projections are retracted into the core before the core and the cavity are separated. Such sliding cores, however, are expensive to manufacture and, because they operate in a hot, moist environment, their useful life is only a fraction of that of a one-piece core.

From the foregoing, it can be seen that what is needed in the art is a protective helmet, and a method and apparatus for making the same, having good shock attenuating properties and which can be molded in one piece with an undercut by conventional molding processes.

It would also be an advancement in the art if a protective helmet could be provided, and a method and apparatus for making the same, in which holes positioned perpendicular to the surface of the helmet could be molded into the helmet without the use of sliding cores.

Such a helmet, and method and apparatus for making the helmet, is disclosed and claimed herein.

SUMMARY OF THE INVENTION

The present invention is directed to a novel protective helmet and a method and apparatus for manufacturing the helmet. The helmet is made of an expanded, resilient polymer, such as polypropylene, polyethylene and polybutylene. Using such an expanded, resilient polymer provides the helmet with sufficient elasticity that many of the manufacturing difficulties encountered with other polymers, such as EPS, are facilitated.

A conventional mold with a cavity and a core is employed in molding the helmet. The mold is configured with the cavity extending around the core, leaving space between the cavity and the core which defines the shape of the helmet. The core and cavity are generally hemispherical in shape, but extending beyond 180 degrees of curvature to provide an undercut in the helmet, i.e. a portion of the helmet extending beyond the maximum perimeter of the hemispherical shell which continues to follow the curvature of the shell towards the center of that maximum perimeter. Utilizing expanded, resilient polymers in molding the helmet provides sufficient elasticity to the helmet that the undercut portion of the helmet will bend to permit the helmet to be removed from the mold at the conclusion of the molding process.

The undercut molded into the helmet may take a variety of shapes, depending on the particular application of the helmet. By way of example, the undercut portion may extend downwardly in the rear of the helmet behind the ears of the wearer, thereby protecting that part of the skull inferior to the occipital lobe. The undercut may also extend downwardly to cover the ears of the wearer. Also, the helmet may have a slight undercut along the front of the helmet.

The helmet is also provided with holes in it to provide ventilation to the wearer of the helmet and to attach a helmet retention system to the helmet. These holes are molded into the helmet at the same time the helmet is molded.

The core and cavity of the mold are configured with projections corresponding in location to the holes in the helmet. In one embodiment, projections corresponding to holes for ventilation and for helmet straps in the rear of the helmet are configured into the cavity half of the mold at the rear portion. The holes for ventilation and helmet straps for the front of the helmet are made by configuring corresponding projections onto the core half of the mold. Such projections are located generally perpendicular to the surface of the helmet at the projection, thereby keeping to a minimum the amount of helmet material (polymer) which must be eliminated to accommodate the hole.

When molding the helmet, the core and the cavity are placed in engagement with each other and the resilient polymer injected into the mold, according to known injection methods. When separating the mold, the cavity is retracted along a straight line of retraction from the cavity. As the cavity commences its retraction, the projections on the cavity will pull the rear portion of the helmet off the core half of the mold. At the same time, however, the projections on the core half on the front portion of the helmet keep that portion of the helmet attached to the core. Thus, as the cavity initially retracts, the helmet tends to pivot about the front of the helmet.

With further retraction of the cavity, the projections in the cavity are pulled free from the holes they have formed in the helmet and the helmet is released from the cavity half of the mold. The force of gravity, possibly accompanied with a blast of air, then forces the helmet to fall off the projections on the core which formed the holes in the front of the helmet. The helmet is then completely freed from the mold.

Thus, it is an object of the present invention to provide a protective helmet having an undercut for providing coverage to the wearer of the helmet.

It is an additional object of the present invention to provide a method and apparatus for manufacturing such a helmet which do not require complicated collapsible cores, but which are inexpensive and durable.

It is a further object of the present invention to provide a protective helmet with holes molded in it for ventilation and/or the mounting of a helmet retention system.

An additional object of the present invention is to provide a method and apparatus for molding holes in the helmet as part of the helmet molding process.

These and other objects and advantages of the present invention will become more fully apparent by examination of the following description of the preferred embodiments and the accompanying drawings.

DETAILED DESCRIPTION OF THE PREFERRED EMBODIMENTS OF THE INVENTION

Figure 1:
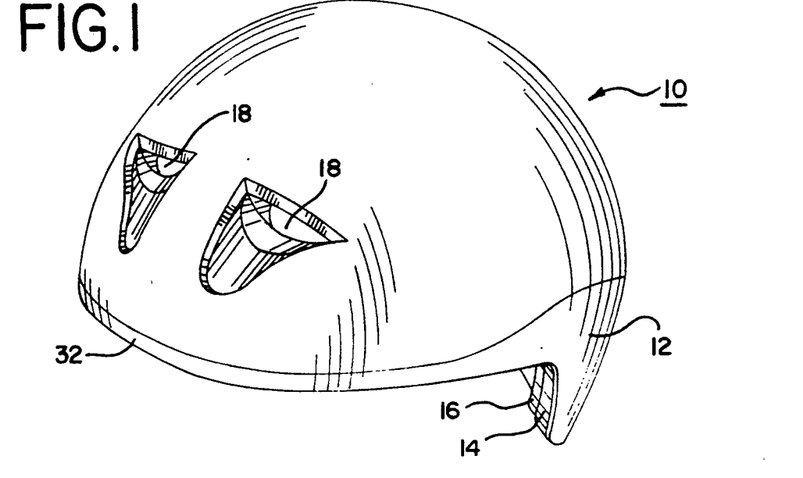
FIG. 1 is a perspective view showing one embodiment of a helmet in accordance with the present invention.

Reference is now made to the figures wherein like parts are referred to by like numerals throughout. With particular reference to FIG. 1, a helmet according to the present invention is generally designated at 10. In one embodiment, the helmet 10 includes a shell 12, an expanded, resilient polymeric liner 14 and foam inserts 16.

The shell 12 may be made of a high-density plastic and preferably extends along the entire outside surface of the liner 14, protecting the liner from puncture. It will be appreciated, however, that the material from which the shell is made will vary according to the how the helmet is to used. Those skilled in the art will recognize that the shell may be made of a fabric, such as Lycra, or of a light plastic such as styrene, or of any other suitable materials as have been used on prior-art helmets. Indeed, for some applications, it may be desirable not to use any shell.

The liner 14 is made of any of a number of expanded, resilient polymers, including, but not limited to, polypropylene, polyethylene and polybutylene. Additionally, copolymer formulations of these resilient polymers are also suitable and within the scope of this invention. A presently preferred material for use in molding the liner 14 is a polypropylene formulation sold by Kanegafuchi Chemical Industry Company Ltd. under the trade name Eperan PP. Such resilient polymers have the elastic properties required for the molding of the helmets of the present invention which properties are not found in semi-rigid, non-resilient polymers, such as polystyrene.

The liner of the present invention is molded by an injection molding process. The mold employed has a core element and a cavity element which operate between an engaged and a disengaged position. In their engaged position, a void is created between the core element and the cavity element defining the shape of the liner to be produced in the mold.

With the core and cavity in an engaged position, compressed beads of an expanded, resilient polymer, as described above, are introduced into the mold. This is in contrast to non-resilient polymeric beads which are partially expanded before being introduced into the mold—if beads of an expandable, non-resilient polymer such as polystyrene were compressed, they would take a compression set and become lodged in the mold.

The amount of resilient polymeric beads that are compressed prior to introduction into the mold is a function of the density desired in the finished product. The beads are compressed by pressurizing the bead hopper. Thus, when the beads are introduced into the mold, the mold is also pressurized, at a pressure slightly less than the pressure in the bead hopper, to promote flow.

Beads are introduced into the mold until the mold is full. The mold is then vented to cause expansion of the beads, thereby filling the interstices existing between beads and causing any remaining voids within the mold to be filled. Either concurrent with the venting process or immediately thereafter, the beads are heated, preferably with steam, causing the beads to fuse together. The mold is thereafter permitted to cool. Once cooled a sufficient amount, the mold is disengaged and the liner is removed from the mold. Depending on the nature of the part being molded, a burst of air or an ejection pin may be employed to assist in ejecting the part from the mold.

Foam inserts 16 can be placed along the liner 14 with Velcro to aid the wearer of the helmet in obtaining an optimum fit. Alternatively, any of a variety of compressible inserts such as are conventionally known for use in protective helmets may be employed.

The shell 12 is preferably configured with front vent holes 18 and rear vent holes 20 (FIG. 3) to vent the helmet. It is presently preferred that two front vent holes and two rear vent holes be employed in the shell. The liner 14 also includes vent holes which correspond in position to the front vent holes 18 and the rear vent holes 20 in the shell 12, as will be explained below in further detail.

Figure 2:
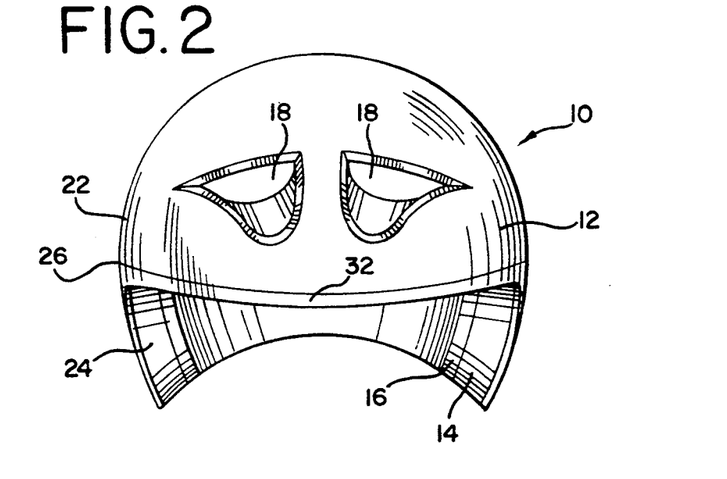
FIG. 2 is a plan view of the front of the helmet illustrated in FIG. 1.
Figure 3:
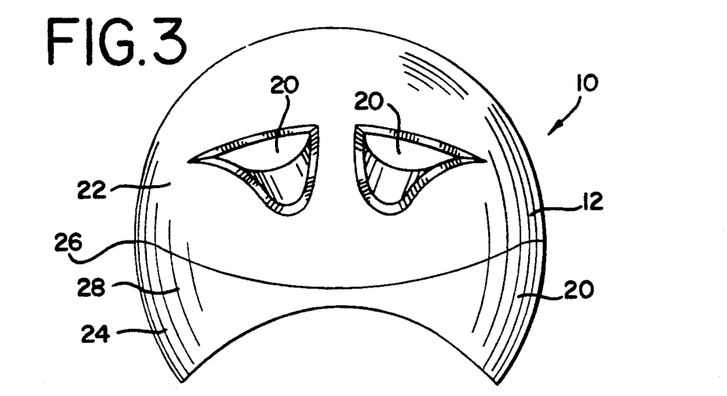
FIG. 3 is a plan view of the rear of the helmet illustrated in FIG. 1.

Referring now to FIGS. 2 and 3, although the helmet shell and liner are each one integral piece, the helmet can generally be divided into two portions for purposes of discussion. The top or generally hemispherical portion 22 is separated from an undercut portion 24 by a maximum perimeter line 26. As will be explained in greater detail below, the inside surface of the helmet generally follows the outside surface of the shell illustrated in FIGS. 2 and 3.

The hemispherical portion 22 is a compound curved surface designed to conform to the top of an average human head. In geometric terms, it most closely resembles a hemispherical shell which is generally elliptical in shape. The hemispherical shell portion extends through approximately 180 degrees of curvature.

The edge of the hemispherical shell portion is defined by the maximum perimeter line. Thus, those portions of the helmet which extend beyond the maximum perimeter line 24, while following the curvature of the hemispherical shell, make the opening of the helmet smaller.

In the embodiment of the invention illustrated in FIGS. 2 and 3, the undercut portion 24 extends down primarily in the rear portion of the helmet and includes a first extension 28 on one side of the helmet and a second extension 30, substantially symmetrical to the first extension, located on the opposite side of the helmet. When in use, the undercut portion extends down behind the ears of the wearer of the helmet and covers the portion of the skull inferior of the occipital lobe, an area not normally protected by many conventional helmets.

The undercut 24 also serves to keep the helmet on the wearer's head. Whereas a helmet lacking an undercut merely sits on top of the wearer's head, the undercut acts to "lock" the helmet on the head by curving the helmet back towards the head below the maximum perimeter line 26. An undercut 24 may be employed in any of a variety of configurations, depending on how the helmet is to be used. For example, a slight undercut may extend down in the front 32 of the helmet. Other possible extensions of the undercut would include extensions for covering the ears and/or the temporal area of the head (see FIG. 8).

Figure 4:
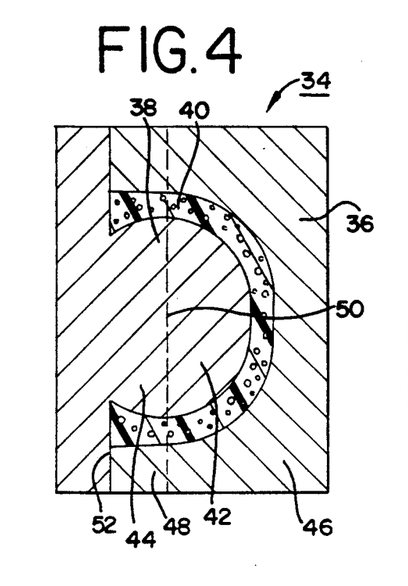
FIG. 4 is a cross-sectional view of a mold according to the present invention for molding a helmet with an undercut portion.

The helmet liner is molded as a one-piece part in a mold indicated at 34 and illustrated in FIG. 4. The mold 34 includes a cavity element 36 and a core element 38. In FIG. 4, the mold 34 is illustrated with the cavity and the core in an engaged position. The void between the core and the cavity elements defines the shape of a liner 40 to be produced in the mold.

Figure 5:
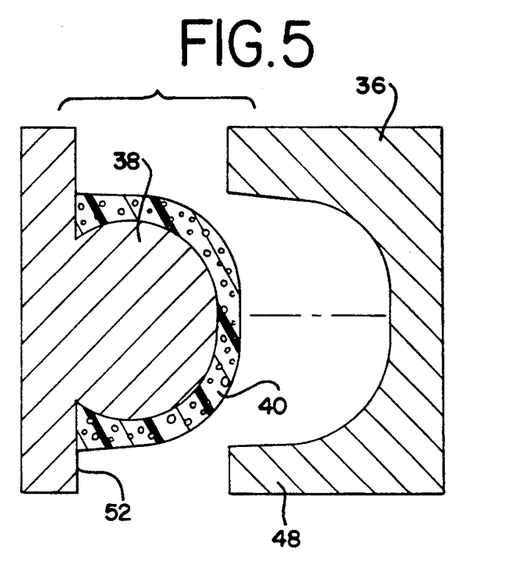
FIG. 5 is a cross-sectional view of the mold illustrated in FIG. 4, with the core and cavity disengaged.

FIG. 5 illustrates the mold of FIG. 4 with the core and cavity in a disengaged position, such as would occur after the liner has been formed and prior to ejection of the part from the mold. In the embodiment of the mold illustrated in FIGS. 4 and 5, the core includes a generally hemispherical portion 42 and an undercut portion 44.

The cavity element 36 also includes a hemispherical portion 46 and an undercut portion 48. The surface of the hemispherical portion 46 of the cavity 36 generally follows the surface of the hemispherical portion 42 of the core 38. However, in this embodiment of the invention, the surface of the undercut portion 48 of the cavity 36 extends substantially laterally from a maximum perimeter line 50 to the mold parting line 52 and does not follow the inward curvature of the surface of the undercut portion 44 of the core 38.

Thus, after molding the liner 40 in the mold 34, the cavity 36 can be disengaged from the core 38 along the parting line 52 and the undercut portion 48 of the cavity will not bind on the liner, as illustrated in FIG. 5. With the mold thus disengaged, the liner can then be removed from the core 38 by a blast of air injected through the core or by employing a core having an injection pin. Importantly, utilizing an expanded, resilient polymer in the manufacture of the liner enables the liner to elastically deform as it is ejected from the core 38.

Figure 6:
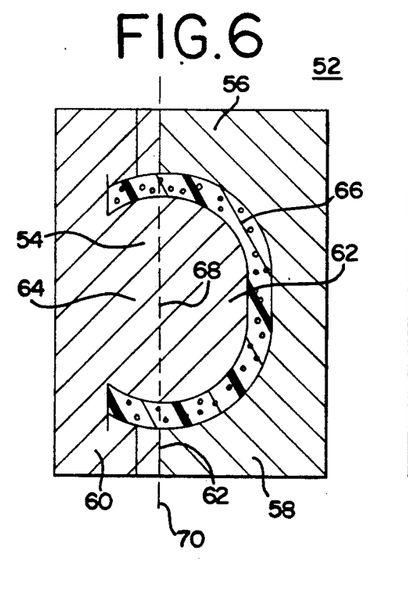
FIG. 6 is a cross-sectional view of an alternative embodiment of a mold according to the present invention for molding a helmet with an undercut.
Figure 7:
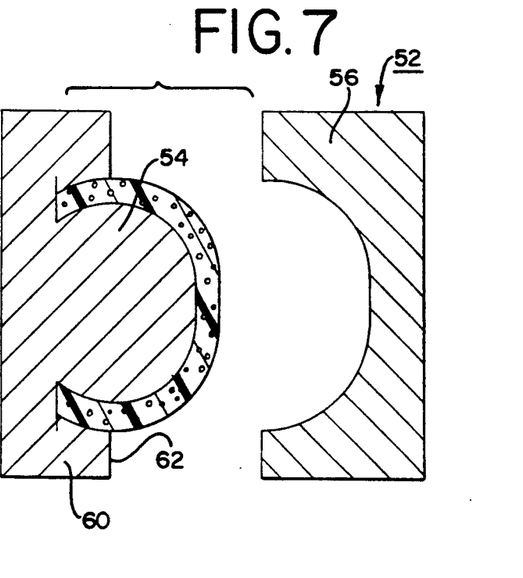
FIG. 7 is a cross-sectional view of the mold illustrated in FIG. 6, with the core and cavity disengaged.

A preferred embodiment of a mold for producing a helmet liner with an undercut is illustrated at 52 in FIGS. 6 and 7. It includes a core 54 and a cavity 56. The cavity 56 is configured with a generally hemispherical portion 58 and an undercut portion 60. Likewise, the core includes a hemispherical portion 62 and an undercut portion 64. In this embodiment, the surface of the cavity generally follows the surface of the core along both the hemispherical portions and the undercut portions, i.e., the wall thickness of the liner 66 does not vary substantially from the hemispherical portion to the undercut portion.

With continued reference to FIGS. 6 and 7, the parting line 68 of the mold 52 is substantially along the maximum perimeter line 70 of the liner 66. Thus, the undercut portion 60 of the cavity remains fixed with respect to the core 54 at all times during the molding process.

FIG. 7 illustrates the mold 52 in its disengaged position, with the part ready to be ejected from the mold. As illustrated, the hemispherical portion of the cavity is retracted, leaving the hemispherical portion of the liner exposed and the undercut portions of the liner retained within the mold. Because the undercut portion of the liner has substantially constant thickness, it can be retracted from the mold without separating the undercut portion 60 of the cavity from the core 54. With the liner made of the materials described previously, the liner has sufficient elasticity to be ejected from the mold without breaking.

Figure 8:
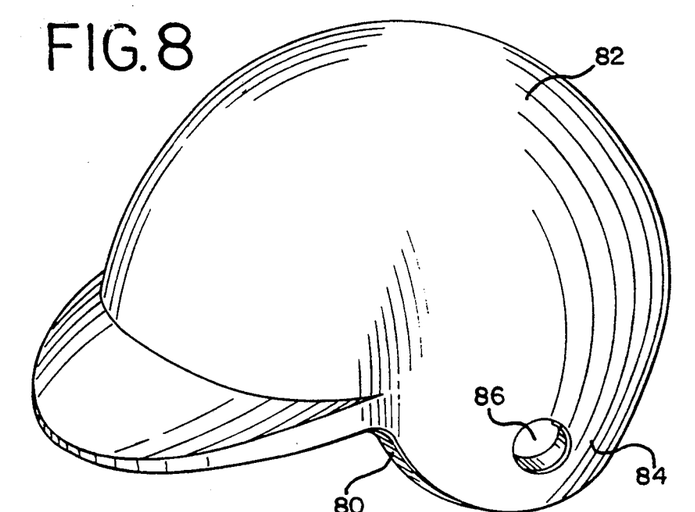
FIG. 8 is an alternate embodiment of the helmet of the present invention, with the undercut portion configured to cover the ears of the wearer of the helmet.

FIG. 8 illustrates an alternative embodiment of the helmet of the present invention. With minor modification to mold 34 (FIGS. 4 and 5) or mold 52 (FIGS. 6 and 7), a liner 80 for a helmet 82 could be molded. Helmet 82 includes an undercut portion 84 for providing protection to the ears and side of the head of the wearer of the helmet, such as could be used as a batter's helmet. The helmet also includes ear holes 86 which may be molded into the liner 80 in accordance with the present invention, as will be explained in more detail below. The helmet illustrated in FIG. 8 is merely illustrative of one of many applications in which an undercut can successfully be utilized in a helmet to provide additional coverage to the wearer.

Figures 9, 10:
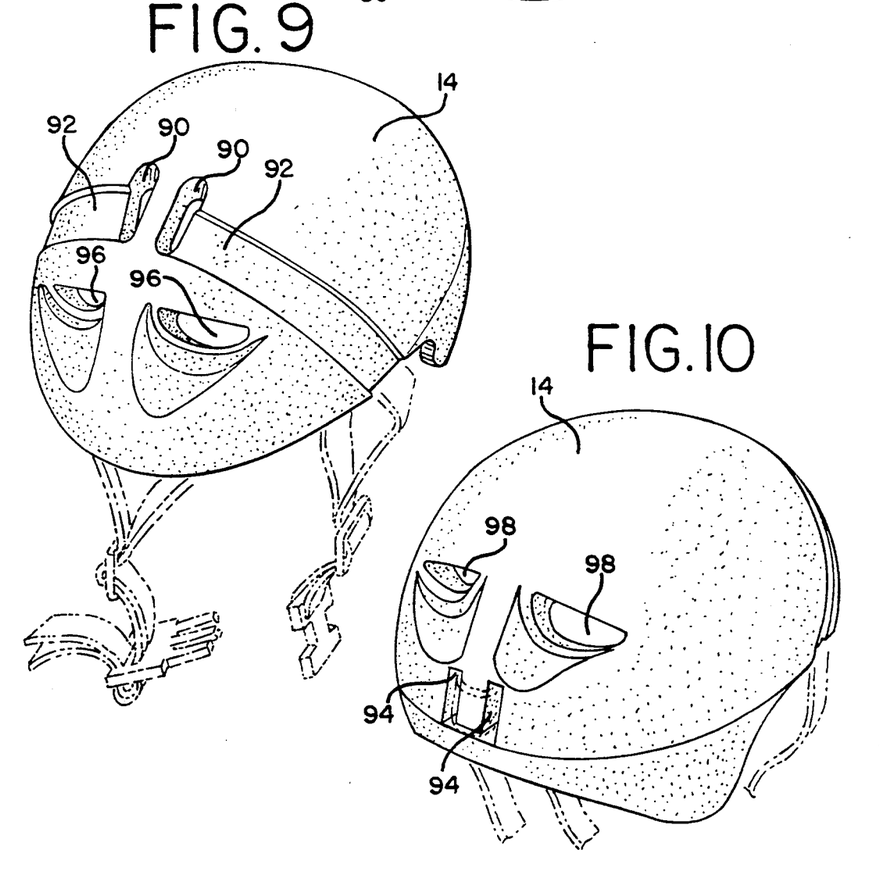
FIG. 9 is a perspective view of the front of a liner of a helmet in accordance with the present invention.
FIG. 10 is a perspective view of the rear of the liner illustrated in FIG. 9.

FIGS. 9 and 10 illustrate the helmet liner 14, such as would be used in the helmet illustrated in FIGS. 1 through 3. Again, it will be appreciated by one skilled in the art that while liner 14 is illustrated as used in combination with a shell, the liner could be used alone as a helmet, depending on how the helmet is sought to be used.

With continued reference to FIGS. 9 and 10, liner 14 includes front strap holes 90, strap indentations 92 and rear strap holes 94 for the mounting of a helmet retention system onto the liner (shown in phantom lines). Liner 14 also includes front vent holes 96 and rear vent holes 98, corresponding generally in location to the front vent holes 18 and the rear vent holes 20, respectively, in the shell (if used—See FIGS. 1 through 3).

All the holes in the liner are preferably configured such that they extend substantially perpendicular to the surface of the liner at the hole. By so configuring the holes, a minimum of material must be taken from the liner to create the hole, thereby preserving to a maximum extent the structural integrity of the liner.

In accordance with the teachings of the present invention, the holes in the liner are formed during the injection molding process at the same time the liner itself is formed. Advantageously, the mold used in forming the holes does not employ moving pieces to fashion the holes, as are used in sliding or collapsible cores utilizing movable inserts.

Figure 11:
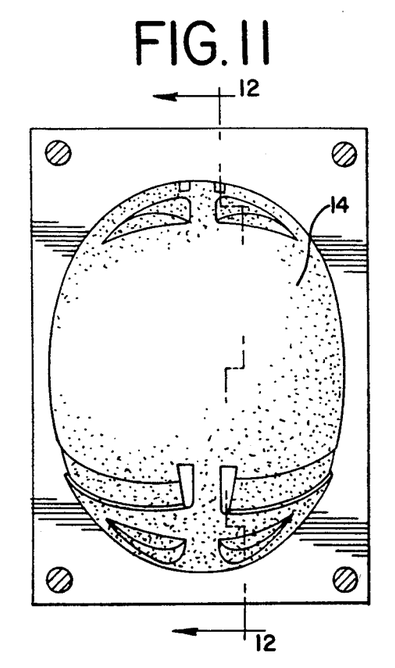
FIG. 11 is a plan view of a helmet in resting in a core of a mold in accordance with the present invention.
Figure 12:
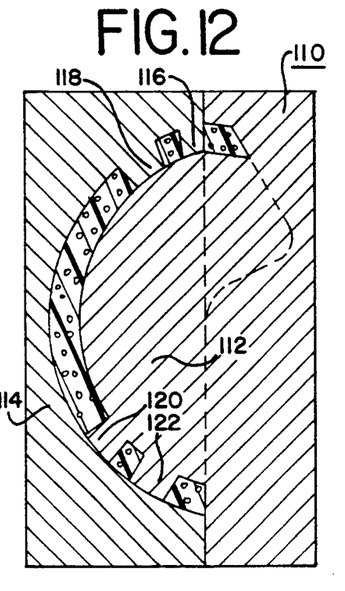
FIG. 12 is a cross-sectional view taken along line 12—12 of FIG. 11, with the cavity half of the mold shown in engagement with the core.

FIG. 11 illustrates a liner 14 as it would appear on a mold. In FIG. 12, a mold 110 according to the present invention for forming holes in the helmet liner, is illustrated in cross section. The mold 110 includes a core element 112 and a cavity element 114. In this preferred embodiment, the cavity element includes a rear strap projection 116 and a rear vent projection 118. Rear strap projection 116 and rear vent projection 118 extend to the surface of the core element 112, thereby filling in a hole-shaped section within the void between the cavity and the core.

The core element 112 is correspondingly configured with a front strap projection 120 and a front vent projection 122, which extend through the void to the surface of the cavity element. As can be seen by inspection of FIG. 12, all hole-forming projections are configured generally perpendicular to the surface of the liner at each respective hole, thereby ensuring that a minimum of material is taken from the liner in making the hole. In this preferred embodiment of the invention, rear strap projection 116 which falls on the maximum perimeter of the liner, extends in a substantially vertical direction as viewed in FIG. 12.

In molding the liner with the mold of FIG. 12, the resilient polymeric beads are injected into the mold following the general procedure previously outlined in connection with FIGS. 4 through 7. In this preferred embodiment of the invention, the mold is disengaged by retracting the cavity element laterally, in the direction of arrow A, along a straight line of retraction. However, it will be appreciated that the same result is obtained if the core is retracted from the cavity, or if both elements are simultaneously retracted from each other.

Figure 13:
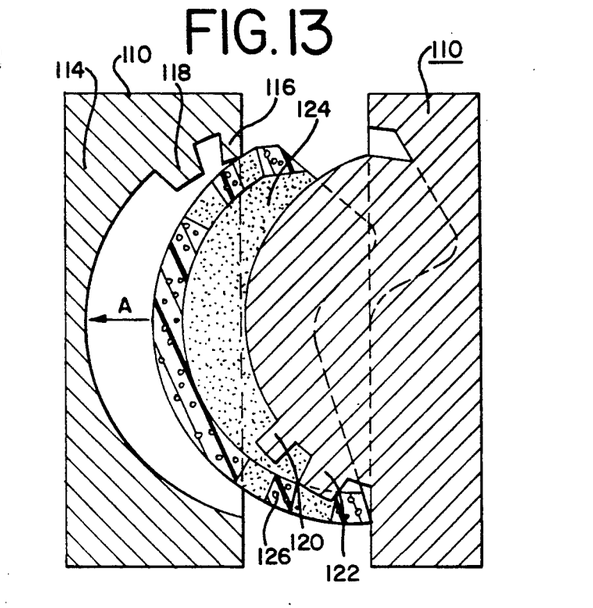
FIG. 13 is a cross-sectional view of the mold illustrated in FIG. 12 with the core and cavity disengaged, illustrating the part being ejected from the mold.

With reference now to FIG. 13, as the cavity element 114 is initially retracted, the rear strap projection 116 and the rear vent projection 118 force the rear portion 124 of the liner off the core element 112. At the same time, however, the front strap projection 120 and the front vent projection 122 prevent the front portion 126 of the liner from releasing from the core element. As a result, the liner rotates, or "rocks," off the top portion of the core as the cavity is initially retracted from the core.

Upon further retraction of the cavity, the rear strap projection 116 and the rear vent projection 118 release the liner (the position illustrated in FIG. 13) and thereafter the force of gravity, possibly assisted with a burst of air, permit the liner to drop off the front strap projection 120 and the front vent projection 122 and entirely release from the core.

Continued retraction of the cavity permits the liner to fall completely out of the mold. At this point, the mold can be engaged and the molding process repeated. By utilizing an expanded, resilient polymer, the liner is sufficiently flexible to elastically deform near the holes to permit the liner to release from the mold. Using such a mold and molding process with a semi-rigid, non-resilient polymer, such as expanded polystyrene, would result in breaking the liner upon retraction of the cavity element.

Figure 14:
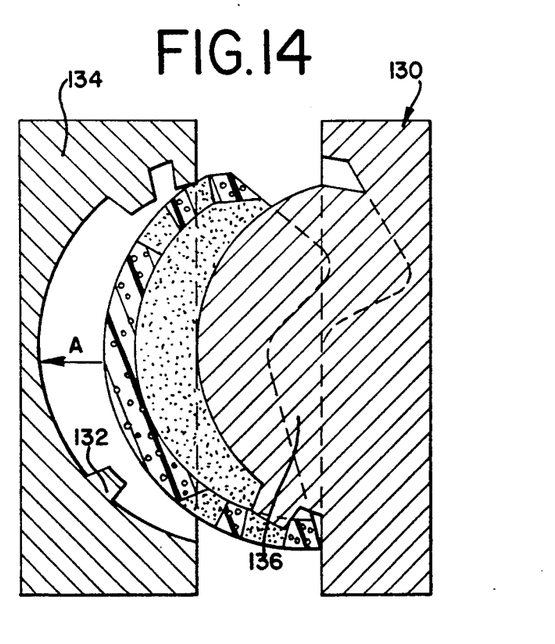
FIG. 14 is a cross-sectional view of an alternative embodiment of a mold in accordance with the present invention with the core and cavity disengaged.

An alternative embodiment of the mold 110 is illustrated at 130 in FIG. 14. It differs from mold 110 in that the front strap projection 132 is configured onto the cavity element 134 rather than on the core element 136. Even with the front strap projection 132 configured on the cavity element 134, the liner will still release from the mold because of the elasticity of the material used in making the liner. Advantageously, the projection does not have to be configured along the line of retraction (arrow A), as would be required if expanded polystyrene were employed, but is configured at an angle to the line of retraction.

Preferably, however, the liner is molded by configuring all projections for holes in the rear of the helmet in the cavity and configuring all projections for holes in the front of the helmet in the core. Alternatively, the projections for holes in the rear of the helmet could be configured in the cavity with all projections for holes in the front of the helmet configured in the core. The particular design may be influenced by the orientation of existing molding and the exact configuration of the holes being molded into the liner.

It will be appreciated by those skilled in the art that a variety of sizes of holes serving different purposes could be molded into a protective helmet by following the teachings of the present invention. For example, ear holes 86 could easily be molded into the liner 80 of the helmet illustrated in FIG. 8 simply by using a mold with one projection configured into a cavity element for the ear hole on one side and configuring a projection into the core element for the ear hole on the opposite side and following the molding procedure outlined above.

It should be appreciated that the apparatus and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

We claim:

1. A process for producing a one-piece element for use in a protective helmet, comprising the steps of:
   introducing compressed, resilient polymeric beads into a pressurized mold having a cavity element, said cavity element having at least one first projection for forming a void extending through the one-piece element on a first lateral side and a core element, the core element having a generally hemispherical surface and an undercut surface, the undercut surface extending from at least part of the hemispherical surface and angled towards the center of the maximum perimeter of the hemispherical surface, said core element further having at least one second projection for forming a void extending through the one-piece element on a second opposite lateral side;
   venting the mold the cause expansion of the beads;
   applying steam to the polymeric beads thereby causing the polymeric beads to fuse to each other to form a one-piece element;
   permitting the mold to cool;
   separating the cavity element from the core element by retracting the cavity element a first distance such that the first projection engages the first lateral side of the one-piece element and removes the first lateral side of the one-piece element from the core element, continuing to retract the cavity element through a second distance such that the first lateral side of the one-piece element is disengaged from the first projection; and
   retracting the cavity element fully.

2. A process for producing a one-piece element for use in a protective helmet as defined in claim 11, wherein said introducing step is preceded by compressing the resilient, polymeric beads in a bead hopper by pressurizing the bead hopper.

3. A process for producing a one-piece element for use in a protective helmet as defined in claim 33, wherein said separating step includes separating the mold along a parting line corresponding generally to the maximum perimeter of the hemispherical surface.

4. A process for producing a one-piece element for use in a protective helmet as defined in claim 1, wherein said removing step includes applying a blast of air to the one-piece element from within the core element.

5. A process for producing a one-piece element for use in a protective helmet as defined in claim 1, wherein said removing step includes applying a force to the one-piece element with an ejector pin from within the core element.

6. A process for producing a one-piece element for use in a protective helmet as defined in claim 1, wherein said removing step includes permitting the force of gravity to disengage the one-piece element completely from the core and fall from the mold.

7. A process for producing a one-piece element for use in a protective helmet as defined in claim 1 wherein said resilient polymeric beads are made from a polymer selected from the group consisting of polypropylene, polybutylene and polyethylene.

8. A process for producing a one-piece element for use in a protective helmet, comprising the steps of:
   introducing compressed, resilient polymeric beads into a pressurized mold to form a one-piece element, the mold having a cavity element and a core element capable of mating engagement and disengagement along a line of retraction, the cavity element having a generally hemispherical surface and at least one first projection configured at an angle to the line of retraction for forming a void extending through the one-piece element on a first lateral side and the core element having a generally hemispherical surface corresponding generally in shape to the human head and at least one second projection for forming a void extending through the one-piece element on a second, opposite lateral side, said second projection positioned at an angle to said line of retraction;
   venting the mold to cause expansion of the polymeric beads;
   applying steam to the polymeric beads thereby causing the polymeric beads to fuse to each other;
   permitting the mold to cool;
   separating the cavity and the core element; and
   removing the one-piece element from the core of the mold.

9. A process for producing a one-piece element for use in a protective helmet as defined in claim 8, wherein the separating step includes retracting the cavity element a first distance such that the first projection engages the first lateral side of the one-piece element and removes the first lateral side of the one-piece element from the core element,
   continuing to retract the cavity element through a second distance such that the first lateral side of one-piece element is disengaged from the first projection, and fully retracting the cavity element.

10. A process for producing a one-piece element for use in a protective helmet as defined in claim 9, wherein said removing step includes permitting the force of gravity to disengage the one-piece element completely from the core and fall from the mold.

* * * * *

UNITED STATES PATENT AND TRADEMARK OFFICE
CERTIFICATE OF CORRECTION

PATENT NO. : 5,298,208
DATED : March 29, 1994
INVENTOR(S) : Kent V. Sibley et al.          Page 1 of 2

It is certified that error appears in the above-indentified patent and that said Letters Patent is hereby corrected as shown below:

On the Title Page

In columns 1 and 2 under "References Cited U.S. PATENT DOCUMENTS", please add the following:

-- 5,123,121      6/1992      Broersma
   4,698,001      10/1987     Vismara
   4,627,115      12/1986     Broersma
   4,594,122      6/1986      McConnell
   4,424,180      1/1984      Lalloz et al.
   3,992,721      11/1976     Morton
   3,712,787      1/1973      Barnes--.

In column 2, line 2, delete "8/1988" and substitute --8/1990--.

In the Claims

In claim 1, line 17, delete the second occurrence of "the" and substitute --to--.

In claim 2, line 2, delete "11" and substitute --1--.

UNITED STATES PATENT AND TRADEMARK OFFICE
CERTIFICATE OF CORRECTION

PATENT NO. : 5,298,208
DATED : March 29, 1994
INVENTOR(S) : Kent V. Sibley et al.

It is certified that error appears in the above-indentified patent and that said Letters Patent is hereby corrected as shown below:

<u>In the Claims (cont.)</u>

In claim 3, line 2, delete "33" and substitute --1--.

In claim 9, line 9, after "of" insert --the--.

Signed and Sealed this

Eighth Day of April, 1997

Attest:

BRUCE LEHMAN

*Attesting Officer*　　　*Commissioner of Patents and Trademarks*